United States Patent
Wagner et al.

(10) Patent No.: US 9,948,911 B2
(45) Date of Patent: Apr. 17, 2018

(54) METHOD AND APPARATUS FOR EFFICIENT DEPTH IMAGE TRANSFORMATION

(71) Applicant: QUALCOMM Incorporated, San Diego, CA (US)

(72) Inventors: Daniel Wagner, Vienna (AT); Alessandro Mulloni, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/845,203

(22) Filed: Sep. 3, 2015

(65) Prior Publication Data
US 2016/0073080 A1    Mar. 10, 2016

Related U.S. Application Data (60) Provisional application No. 62/046,860, filed on Sep. 5, 2014.

(51) Int. Cl.
| | | |
|---|---|---|
| H04N 13/00 | (2018.01) | |
| G06T 5/00 | (2006.01) | |
| G06T 5/50 | (2006.01) | |
| G06T 7/55 | (2017.01) | |
| H04N 13/02 | (2006.01) | |

(52) U.S. Cl.
CPC ......... *H04N 13/0022* (2013.01); *G06T 5/006* (2013.01); *G06T 5/50* (2013.01); *G06T 7/55* (2017.01); *H04N 13/0011* (2013.01); *H04N 13/0239* (2013.01); *H04N 13/0257* (2013.01); *G06T 2207/10024* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 8,446,492 B2 | 5/2013 | Nakano et al. | |
| 8,717,414 B2 * | 5/2014 | Kang | H04N 5/2628 348/211.1 |
| 9,208,571 B2 * | 12/2015 | Evertt | H04N 5/2226 |
| 9,270,974 B2 * | 2/2016 | Zhang | H04N 13/0207 |

(Continued)

FOREIGN PATENT DOCUMENTS

KR    20170025214 A   *   3/2017

OTHER PUBLICATIONS

McMillan Jr, L. (1997). An image-based approach to three-dimensional computer graphics (Doctoral dissertation, University of North Carolina at Chapel Hill).*

(Continued)

*Primary Examiner* — Michelle M Entezari
*Assistant Examiner* — Michelle M Hausmann
(74) *Attorney, Agent, or Firm* — Austin Rapp (57) ABSTRACT

Disclosed are a system, apparatus, and method for depth camera image re-mapping. A depth camera image from a depth camera may be received and a depth camera's physical position may be determined. The depth camera's physical position may be determined relative to an other physical position, such as the physical position of a color camera. The depth camera image may be transformed according to a processing order associated with the other physical position.

24 Claims, 7 Drawing Sheets

(56) References Cited

U.S. PATENT DOCUMENTS

| | | | | |
|---|---|---|---|---|
| 9,336,625 | B2* | 5/2016 | Evertt | G06K 9/00201 |
| 9,684,953 | B2* | 6/2017 | Kuster | G06T 5/50 |
| 9,767,545 | B2* | 9/2017 | Koppal | G06T 5/50 |
| 9,818,232 | B2* | 11/2017 | Mittal | G06T 7/90 |
| 9,841,271 | B2* | 12/2017 | Nakazato | G01B 11/03 |
| 2005/0174346 | A1* | 8/2005 | Park | G06T 15/04 |
| | | | | 345/422 |
| 2009/0201384 | A1* | 8/2009 | Kang | H04N 5/247 |
| | | | | 348/222.1 |
| 2010/0007717 | A1* | 1/2010 | Spektor | G06K 9/00355 |
| | | | | 348/43 |
| 2011/0115886 | A1 | 5/2011 | Nguyen et al. | |
| 2013/0010073 | A1 | 1/2013 | Do et al. | |
| 2013/0010079 | A1* | 1/2013 | Zhang | H04N 13/0207 |
| | | | | 348/47 |
| 2013/0100119 | A1* | 4/2013 | Evertt | G06K 9/00201 |
| | | | | 345/419 |
| 2013/0106849 | A1* | 5/2013 | Ha | G06T 5/005 |
| | | | | 345/420 |
| 2014/0064607 | A1 | 3/2014 | Grossmann et al. | |
| 2014/0142729 | A1* | 5/2014 | Lobb | G06F 3/011 |
| | | | | 700/90 |
| 2014/0293010 | A1 | 10/2014 | Nguyen et al. | |
| 2014/0313290 | A1 | 10/2014 | Tech et al. | |
| 2015/0199816 | A1* | 7/2015 | Freeman | G06T 7/0044 |
| | | | | 345/633 |
| 2015/0221126 | A1* | 8/2015 | Liu | G06T 15/20 |
| | | | | 382/276 |
| 2015/0348429 | A1* | 12/2015 | Dalal | G09B 5/06 |
| | | | | 434/258 |
| 2016/0301910 | A1* | 10/2016 | Lucas | H04N 13/0271 |

OTHER PUBLICATIONS

De Sorbier, François, et al. "Augmented reality for 3D TV using depth camera input." Virtual Systems and Multimedia (VSMM), 2010 16th International Conference on. IEEE, 2010.*

Machine Translation KR 2017-0025214 A.*

Henry et al., "RGB-D mapping: Using Kinect-style depth cameras for dense 3D modeling of indoor environments," The International Journal of Robotics Research, vol. 31, No. 5, Feb. 10, 2012, 17 pgs.

McMillan et al., "Computing Visibility Without Depth," ACM Computing Surveys IEEE Computer Graphics and Applications IEEE Transactions on Computers, Aug. 6, 1995, 22 pgs.

Shade et al., "Layered Depth Images," Computer Graphics, Siggraph 98 Conference Proceedings, Orlando, FL., Jul. 19-24, 1998, 12 pgs.

Sorbier et al., "Depth Camera Based System for Auto-Stereoscopic Displays," 2010 IEEE International Workshop on Multimedia Signal Processing (MMSP '10) Saint Malo, France, Oct. 4-6, 2010, 6 pgs.

PCT International Search Report and Written Opinion for International Application No. PCT/US2015/048678, dated Dec. 4, 2015, 12 pages.

International Preliminary Report on Patentability—PCT/US2015/048678, The International Bureau of WIPO—Geneva, Switzerland, dated Jan. 5, 2017.

* cited by examiner

METHOD AND APPARATUS FOR EFFICIENT DEPTH IMAGE TRANSFORMATION

CROSS-REFERENCE TO RELATED APPLICATIONS

This application claims the benefit of U.S. Provisional Application No. 62/046,860, filed on Sep. 5, 2014, entitled, "METHOD AND APPARATUS FOR EFFICIENT DEPTH IMAGE TRANSFORMATION" which is herein incorporated by reference.

FIELD

The subject matter disclosed herein relates generally to depth camera output image processing.

BACKGROUND

Mobile or portable devices often contain a wide feature set to satisfy a variety of use requirements. These devices can include a wide variety of sensors for recording environment data, such as color image camera sensors. Some devices also include depth camera sensors to capture object distance information for a scene. For some applications (for example, augmented reality) depth image information may be used for mapping 3D objects in an environment. The depth camera is typically a separate camera positioned in a different but nearby position than the color camera(s).

Therefore, when a depth camera and color camera are triggered at approximately the same time, the depth camera and camera sensor typically capture images from slightly different viewpoints. The slight differences in viewpoint and other factors such as focal length, resolution, or other differences in camera/sensor properties means that some sort of translation may occur in order to properly apply depth information in a color camera coordinate system. Application of depth information to the color camera coordinate system is desirable because, typically, output of augmented reality applications utilize a color camera image of a scene as the basis for augmentation.

Depth images may be composed of pixels in a 2D coordinate system, where each pixel represents a depth or distance value. The depth information from the depth camera can be mapped to a color camera to assist in augmented reality applications.

However, an augmented reality system typically includes a depth camera physically separate and distinct from the color camera. Therefore, the camera viewpoints for the depth camera and the color camera will not be an identical match. For example, the depth camera may be positioned to the left, right, or some direction relative to the color camera (for example, integrated into a mobile phone or other device).

Because of the parallax effect, the depth map of the depth camera may have a depth value for two points at two different depths where, from the perspective of the color camera, the closer of the two points occludes the further, and hence, the color camera's image captures only the closer of the two points. When attempting to integrate data from the depth map to a color image taken by a color camera, ignoring this above described occlusion can produce errors in output and impact user experience.

SUMMARY OF THE DESCRIPTION

Embodiments disclosed herein may relate to a method for depth camera image transformation. The method may include receiving a depth camera image from a depth camera and determining, according to the depth camera's physical position relative to an other physical position, a processing order for transforming points of the depth camera image into a depth image at an other coordinate system associated with the other physical position. The method may also include transforming, without testing for depth, the depth camera image into the coordinate system of the other coordinate system according to the determined processing order.

Embodiments disclosed herein may also relate to a machine readable non-transitory storage medium with instructions to perform depth camera image transformation. The medium may include instructions to receive a depth camera image from a depth camera and determine according to the depth camera's physical position relative to an other physical position, a processing order for transforming points of the depth camera image into a depth image at an other coordinate system associated with the other physical position. The medium may also include instructions to transform, without testing for depth, the depth camera image into the coordinate system of the other coordinate system according to the determined processing order.

Embodiments disclosed herein may also relate to an apparatus that includes means for depth camera image transformation. The apparatus may include means for receiving a depth camera image from a depth camera and means for determining, according to the depth camera's physical position relative to an other physical position, a processing order for transforming points of the depth camera image into a depth image at an other coordinate system associated with the other physical position. The apparatus may also include means for transforming, without testing for depth, the depth camera image into the coordinate system of the other coordinate system according to the determined processing order.

Embodiments disclosed herein may further relate to a mobile device including a processor and a storage device configurable to store instructions to perform depth camera image transformation. The device may include instructions to receive a depth camera image from a depth camera and determine according to the depth camera's physical position relative to an other physical position, a processing order for transforming points of the depth camera image into a depth image at an other coordinate system associated with the other physical position. The device may also include instructions to transform, without testing for depth, the depth camera image into the coordinate system of the other coordinate system according to the determined processing order.

Other features and advantages will be apparent from the accompanying drawings and from the detailed description.

DETAILED DESCRIPTION

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

As introduced above, utilizing a depth camera sensor in combination with a color/RGB (Red, Green, and Blue) camera sensor can create occlusions if not properly handled. One way to correct for two camera occlusion is to map the depth data from the depth camera point of view to the color camera point of view. Mapping the depth data may include unprojecting the depth map data, transforming them to the new view point, and projecting them again. As part of the typical mapping process, multiple depth map samples may land at the same pixel when only the closest distance entry should be stored. One solution to determining which pixel should be stored is to test whether an entry is already present in the new map, and determine if that previously stored entry is closer (determining occlusion). Determining occlusion as introduced herein may also be referred to as testing for depth, which takes processing time to complete for each pixel that may be occluded.

In one embodiment, Efficient Depth Map Transformation (described herein simply as "EDIT") transforms (for example as a process, module, engine, or method integrated into a device such as device 100 described below) a depth map to a color camera coordinate system while considering occlusions and without explicit pixel presence and distance testing. In one embodiment, EDIT captures depth camera images and color camera images and efficiently processes the depth camera images by determining the depth camera's physical location relative to another physical location, such as the location of a color camera. The depth camera image may be transformed into the coordinate system of the color camera in an order determined by the relative physical location. For example, if the depth camera is installed to the right of a color camera, EDIT can transform points from the depth camera images in a right to left processing order, which may be also described herein as a scanning order. Other physical locations are possible and are described in greater detail below. The transform of points may be much faster than previous techniques because no explicit test for depth or occlusion occurs, nor is such a test required while using the techniques of EDIT described herein.

Figure 1:
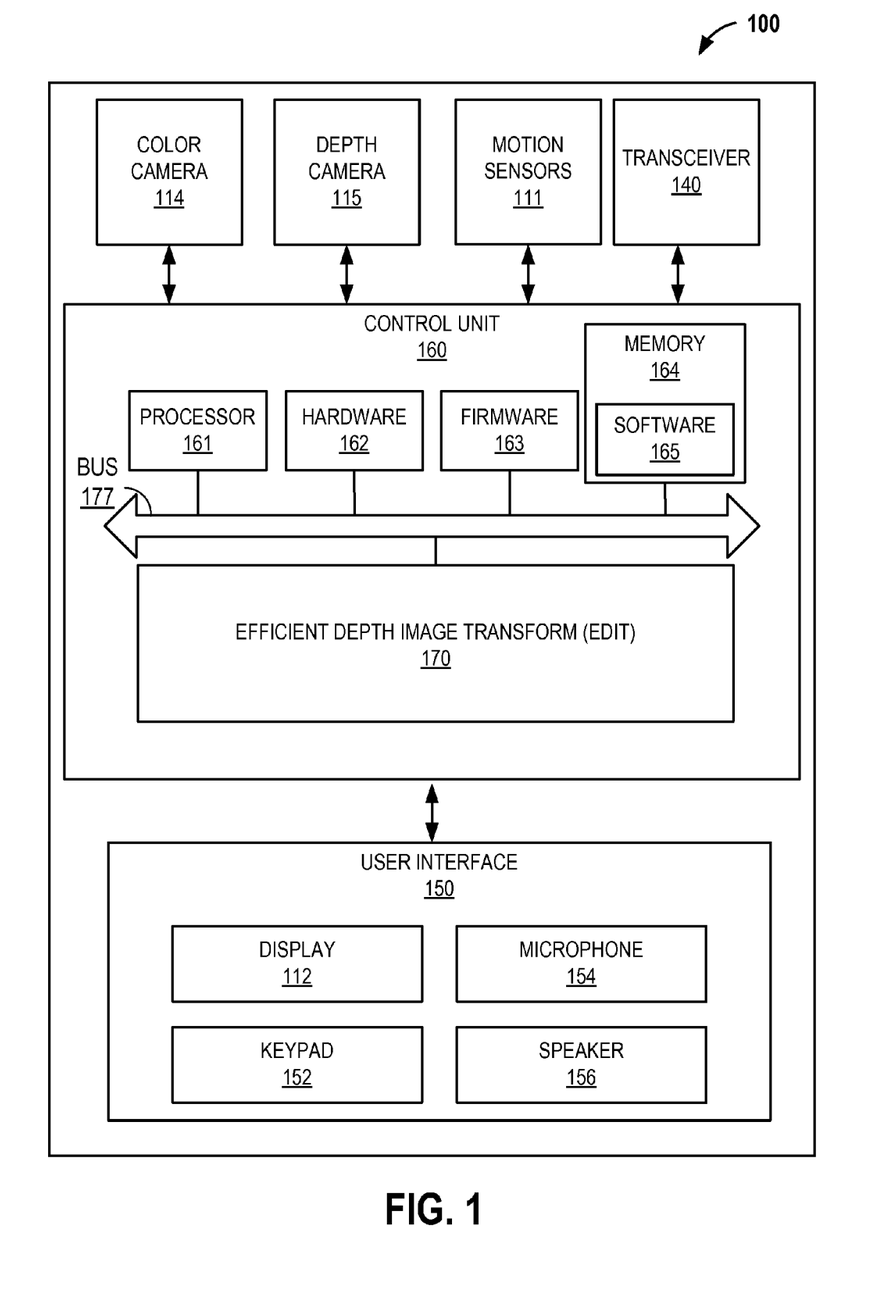
FIG. 1 is a block diagram of a system in which aspects of Efficient Depth Image Transformation (EDIT) may be practiced, in one embodiment.

FIG. 1 is a block diagram illustrating a device in which embodiments of the invention may be practiced. The system may be a device 100, which may include a general purpose processor 161, EDIT module 170, and a memory 164. EDIT module 170 is illustrated separately from processor 161 and/or hardware 162 for clarity, but may be combined and/or implemented in the processor 161 and/or hardware 162 based on instructions in the software 165 and the firmware 163. Control unit 160 can be configured to implement methods of performing EDIT as described herein. For example, the device 100 and control unit 160 can be configured to implement the process described in FIG. 2 below.

The device 100 may be a: mobile device, wireless device, cell phone, augmented reality device (AR), personal digital assistant, wearable device (for example, eyeglasses, watch, head wear, or similar bodily attached device), mobile computer, tablet, personal computer, laptop computer, data processing device/system, server, or any type of device that has processing and/or displaying capabilities.

Device 100 may include a screen or display 112 capable of rendering color images, including 3D images. In some embodiments, display 112 may be used to display live images captured by color camera 114, Augmented Reality (AR) images, Graphical User Interfaces (GUIs), program output, etc. In some embodiments, display 112 may comprise and/or be housed with a touchscreen to permit users to input data via some combination of virtual keyboards, icons, menus, or other Graphical User Interfaces (GUIs), user gestures and/or input devices such as styli and other writing implements. In some embodiments, display 112 may be implemented using a Liquid Crystal Display (LCD) display or a Light Emitting Diode (LED) display, such as an Organic LED (OLED) display. In other embodiments, display 112 may be a wearable display, which may be operationally coupled to, but housed separately from, other functional units in device 100. In some embodiments, device 100 may comprise ports to permit the display of the 3D reconstructed images through a separate monitor, such as display 112, coupled through a wired and/or wireless interface to device 100.

User interface 150 may also include a keyboard, keypad 152, or other input device through which the user can input information into the device 100. If desired, integrating a virtual keypad into the display 112 with a touch screen/sensor may obviate the keyboard or keypad 152. The user interface 150 may also include a microphone 154 and speaker 156, for example, if the device 100 is a mobile platform such as a cellular telephone. Device 100 may include other elements unrelated to the present disclosure, such as a satellite position system receiver, power device (for example, a battery), as well as other components typically associated with portable and non-portable electronic devices.

The device 100 may function as a mobile/portable platform or wireless device and may communicate via one or more wireless communication links through a wireless network that are based on or otherwise support any suitable wireless communication technology. For example, in some aspects, the device 100 may be a client or server, and may associate with a wireless network. In some aspects the network may comprise a body area network or a personal area network (for example, an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web sites, etc.

Device 100 may implement an AR system used in a variety of environments (for example, shopping malls, streets, offices, homes or anywhere a user carries their portable device). Users can interface with multiple features of their device 100 in a wide variety of situations. In an AR context, a user may use their device to view a representation of the real world through the display of their device. A user may interact with their AR capable device by using their device's camera to receive real world images/video and process the images in a way that superimposes additional or alternate information onto the displayed real world images/video on the device. As a user views an AR implementation on their device, real world objects or scenes may be replaced or altered in real time on the device display. Virtual objects (for example, text, images, video) may be inserted into the representation of a scene depicted on a device display.

In some embodiments, device 100 may comprise image sensors such as CCD, or complementary metal-oxide semiconductor (CMOS) sensors and/or red green and blue (RGB) camera(s) 114, which are hereinafter referred to as "color camera 114". Color camera 114 may convert an optical image into an electronic or digital image and may send captured images to processor 161.

In general, color camera 114 may be a color or grayscale camera, which provide "color information," while "depth information" may be provided by a depth sensor (for example, depth camera 115). Although illustrated as part of device 100, it is understood that one or both of the color camera 114 and the depth camera 115 may not be integrated into device 100, but rather device 100 receives data input from a stand-alone color camera 114 and/or depth camera 115. The term "color information" as used herein refers to color and/or grayscale information. In general, as used herein, a color image or color information may be viewed as comprising 1 to N channels, where N is some integer dependent on the color space being used to store the image. For example, an RGB image comprises three channels, with one channel each for Red, Blue and Green information.

Depth information may be captured in a variety of ways using depth sensors (for example, depth camera 115). The term "depth sensor" is used to refer to functional units that may be used to obtain depth information independently from color camera 114. As a further example, depth sensor may take the form of a light source coupled to device 100. In one embodiment, the light source may project a structured or textured light pattern, which may consist of one or more narrow bands of light, onto objects in a scene. Depth information may then be obtained by exploiting geometrical distortions of the projected pattern caused by the surface shape of the object. Depth camera 115 may be physically installed in a same general location as color camera 114, however the depth camera 115 may be physically offset to one side of the color camera 114. For example, the depth camera 115 may be installed in a device such that the depth camera is to one or more combinations of top, bottom, left, or right of the color camera. Therefore, because depth camera 115 and color camera 114 are not exactly overlapping with an identical viewpoint, each camera may capture different scenes although triggered at the approximately equal times. Furthermore, depth camera 115 and color camera 114 may have different coordinate systems such that output images from the depth camera are transformed to the coordinate system of the color camera 114 for use in an augmented reality system or output.

In some embodiments, device 100 may comprise multiple cameras, such as dual front cameras and/or a front and rear-facing cameras, which may also incorporate various sensors. In some embodiments, cameras may be capable of capturing both still and video images. In some embodiments, cameras may be stereoscopic video cameras capable of capturing images at 30 frames per second (fps). In one embodiment, images captured by cameras may be in a raw uncompressed format and may be compressed prior to being processed and/or stored in memory 164. In some embodiments, image compression may be performed by processor 161 using lossless or lossy compression techniques.

The depth camera 115 and color camera 114 are preferably integrated into device 100 at approximately the same alignment such that the roll angle, but not necessarily translation or other rotation angles, is less than +/−0.1 degrees of offset difference between the positions of the two camera sensors.

In some embodiments, processor 161 may also receive input from motion sensors 111. Sensors 111 may comprise 3-axis accelerometer(s), 3-axis gyroscope(s), and/or magnetometer(s). Sensors 111 may provide velocity, orientation, and/or other position related information to processor 161. In some embodiments, sensors 111 may output measured information associated with the capture of each image frame by color camera 114 and depth camera 115. In some embodiments, the output of sensors 111 may be used in part by processor 161 to determine a pose of color camera 114 and depth camera 115 and/or device 100.

The pose of color camera 114 refers to the position and orientation of the color camera 114 relative to a frame of reference. In some embodiments, camera pose may be determined for 6-Degrees Of Freedom (6DOF), which refers to three translation components (which may be given by X,Y,Z coordinates of a frame of reference) and three angular components (for example, roll, pitch and yaw relative to the same frame of reference).

In some embodiments, the pose of color camera 114 and/or device 100 may be determined and/or tracked by processor 161 using a visual tracking solution based on images captured by color camera 114. For example, Simultaneous Localization And Mapping (SLAM) Module 175 running on processor 161 may implement and execute computer vision based tracking, model-based tracking, and/or SLAM methods. SLAM refers to a class of techniques where a map of an environment, such as a map of an environment being modeled by device 100, is created while simultaneously tracking the camera's pose relative to that map. In some embodiments, the methods implemented by SLAM module 175 may be based on color or grayscale image data captured by color camera 114 and may be used to generate estimates of 6DOF pose measurements of the camera. In some embodiments, the output of sensors 111 may be used to estimate, correct, and/or otherwise adjust the estimated pose. Further, in some embodiments, images captured by color camera 114 and depth camera 115 may be used to recalibrate or perform bias adjustments for sensors 111.

Figure 2:
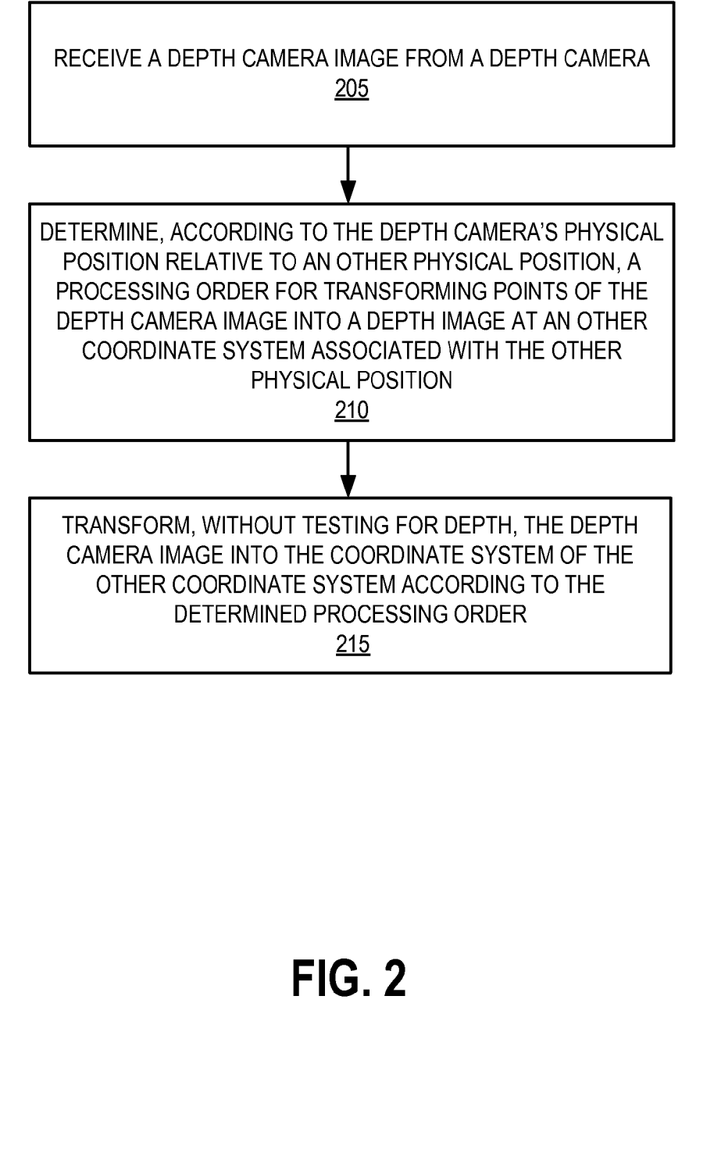
FIG. 2 is a method for performing EDIT, in one embodiment.

FIG. 2 is a method for performing EDIT, in one embodiment. At block 205, the embodiment (for example, EDIT) receives a depth camera image from a depth camera.

At block 210, the embodiment determines, according to the depth camera's physical position relative to an other physical position, a processing order for transforming points of the depth camera image into a depth image at an other coordinate system associated with the other physical position. For example, the other physical position may be a color camera's physical position. Prior to determining the processing order, in some implementations, the embodiment receives an indication of the depth camera's physical position relative to the other physical position. Alternatively, the depth camera's relative physical position to, for example, a color camera's physical position may be known and the embodiment may not receive an indication of the depth camera's relative physical position. In some embodiments, the transformation of points of the depth camera image is preceded by the unprojection of the 2D pixels from the depth camera image into 3D points. In other words, unprojecting takes a 2D array of depth values and creates an array of 3D points as seen from the viewpoint of the depth camera. In other embodiments, the unprojection of the 2D pixels from the depth camera image is integrated into the transformation of block 210 instead of being performed as a separate process or calculation. In one embodiment, EDIT performs a projection of the transformed 3D points back into pixels/points for assignment into the coordinate system of the color camera. The projection may occur after or as part of the transformation, of block 210.

In one embodiment, the depth camera has intrinsic properties such as focal length, principal point, and distortion values. EDIT may leverage the intrinsic properties of both cameras when transforming the depth camera image pixels/points to the coordinate system of the color camera.

At block 215, the embodiment transforms, without testing for depth, the depth camera image into the coordinate system of the other coordinate system according to the determined processing order. Further illustrated discussion for various processing orders are described in relation to FIGS. 6-9 below.

Figure 3:
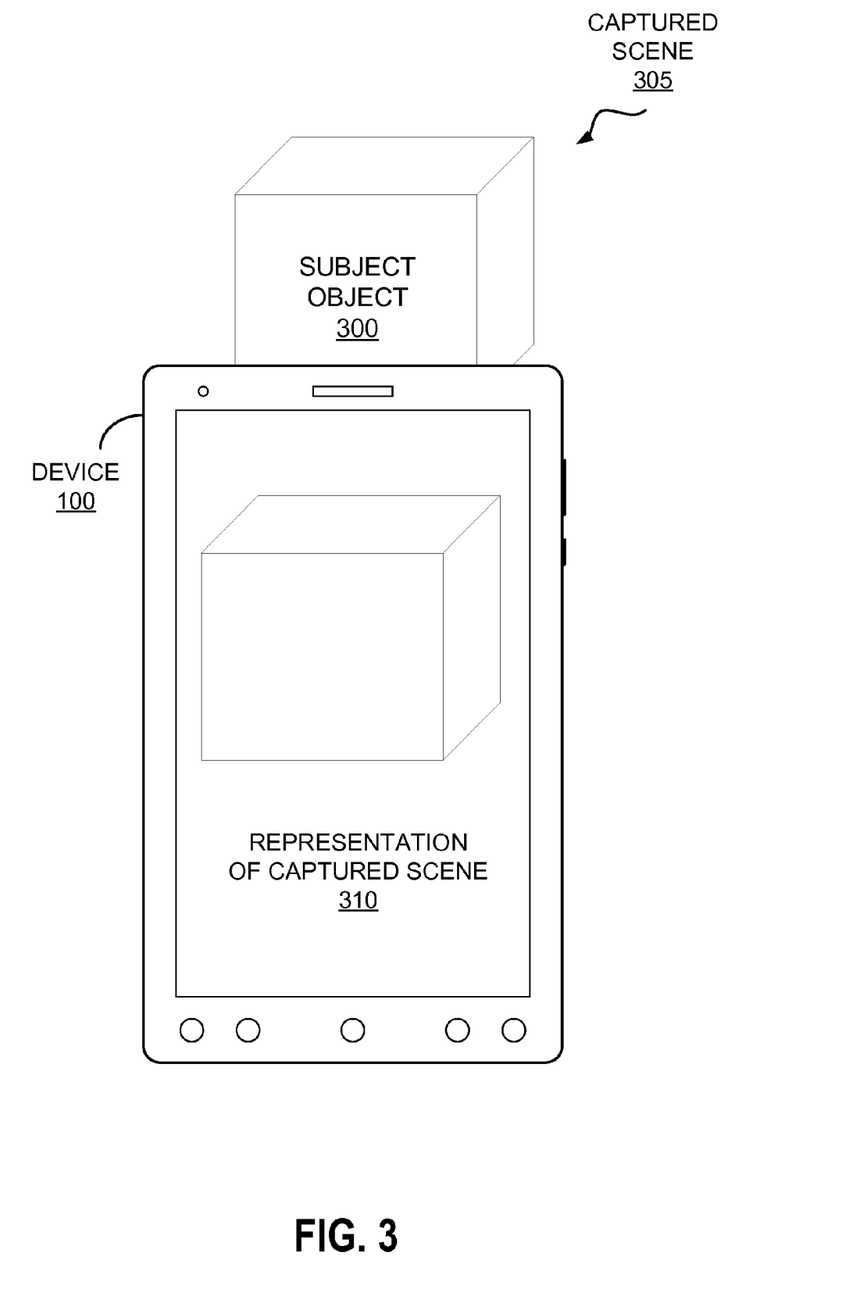
FIG. 3 illustrates a device to capture a scene including a subject object, in one embodiment.

FIG. 3 illustrates a device scene capture of a subject object, in one embodiment. For example, device 100 may capture a scene 305 on color camera 114 and depth camera 115 (see, for example, FIGS. 1, 6, and 7). A representation of the scene 310 may be displayed on device 100.

Figure 4:
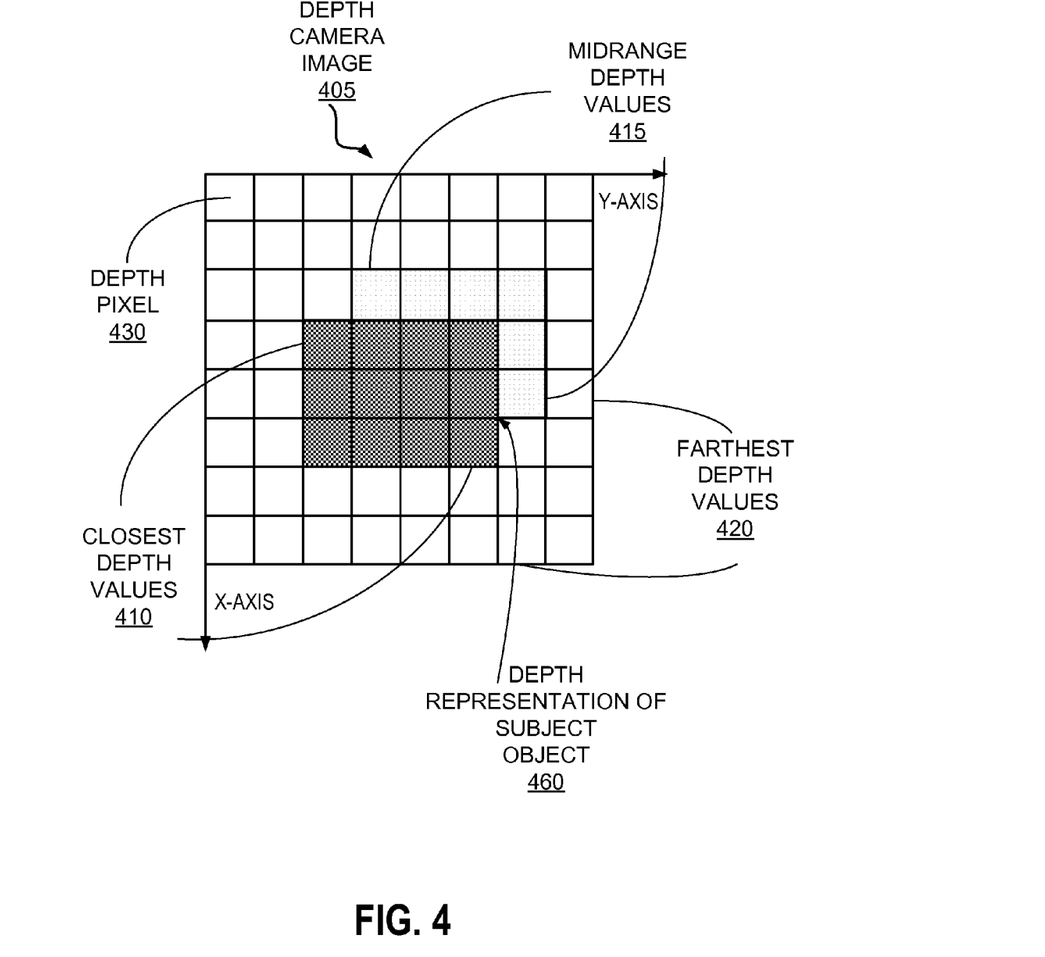
FIG. 4 illustrates a depth camera image of the scene from FIG. 3, in one embodiment.

FIG. 4 illustrates a depth camera image capture of the scene illustrated in FIG. 3, in one embodiment. Depth camera images (for example, depth camera image 405 containing a depth representation of subject object 460) may be composed of depth pixels (for example, depth pixel 430) at each 2D coordinate in the depth image. Each depth pixel represents a depth value (for example, a distance from the depth camera sensor to a physical point in space on a subject object). Darker (i.e., greater intensity) pixels in a depth camera image indicate the point on a subject objects (for example, the front face of the subject object 300) are physically closer (i.e., in proximity) to the device and depth camera sensor. The side of subject object 300 angled away from the depth camera 115 may be represented in the depth image by depth pixels with lower/less intensity than the closest surface of the object, yet higher/greater intensity than farther depth pixels. For example, the side of the subject object 300 may be represented in a depth camera image with midrange depth values 415. Subject object 300 is illustrated without a background or without resting on an object surface, and may be considered effectively suspended in air. Therefore, the pixels surrounding subject object 300 may have the equivalent of no-intensity or infinite distance as determined from the depth camera 115 image.

As introduced above, the roll angle between the depth and color sensors may impact the accuracy of the occlusion handling by EDIT. For example, each line in the target image may be processed independently and without specific occlusion testing. Therefore, artifacts may be introduced if (for example, due to rotation), a line at row N spills over to N−1, which has already been written. This may occur when the rotation is large enough to creates a vertical offset of more than 0.5 pixels.

Figure 5:
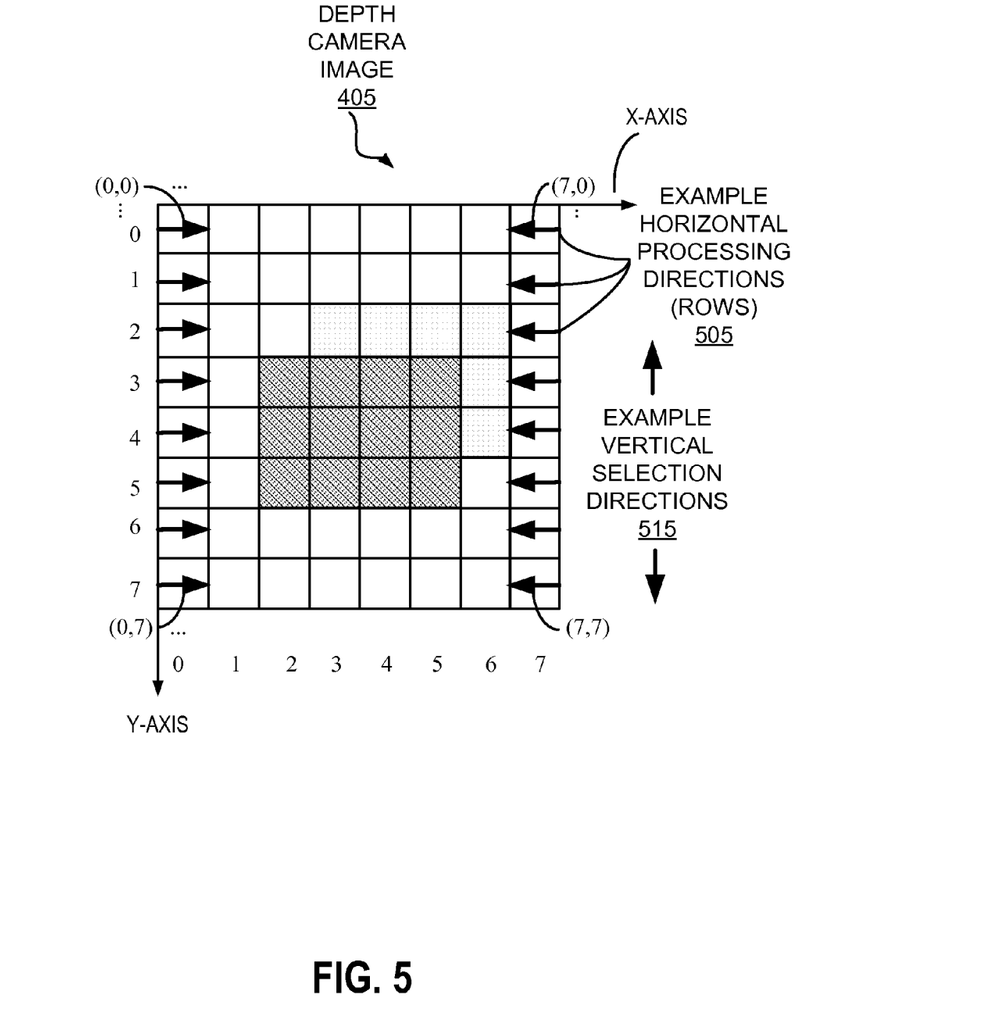
FIG. 5 illustrates a sample of possible processing directions performed by EDIT, in one embodiment.

FIG. 5 illustrates a sample of possible processing directions performed by EDIT, in one embodiment. FIG. 5 illustrates a depth camera image as a grid of 2D coordinates, where each coordinate represents a depth from the depth camera sensor to a respective object point. For example, EDIT may process lines the image according to a direction determined from the relative physical positioning of the depth camera relative to another physical location/position, such as the location of a color camera. Therefore, EDIT processes pixels in a depth camera image in a sequence or direction such that subsequent depth pixels (occluding pixels) may automatically overwrite or replace prior depth pixels (occluded pixels) during transformation to the 2D color camera's coordinate system. Example processing directions illustrated in FIG. 5 originate from one edge of the depth camera image, and end at the opposite edge of the depth camera image automatically replacing prior depth pixels when two or more depth pixels are assigned to a same color pixel.

In one embodiment, EDIT may process a depth camera image 405 from one of the corners or edges of the image and proceed to process the depth camera image in a direction defined by the relative physical placement of the color and depth cameras.

For example, EDIT may process the depth camera image from the top left of the depth camera image and proceed to process pixels across the depth camera image from left to right. As illustrated in FIG. 5, EDIT may begin processing at an edge of the depth camera image and proceed across to the opposite edge (for example, the edge may be the farthest most pixel at a left or right side of the depth camera image).

In some embodiments, processing order includes a horizontal depth camera pixel processing for a first row (for example, rows 505) before proceeding in a vertical direction (for example, vertical direction 515 relative to image top/up or bottom/down) to select a second row for additional horizontal depth camera pixel processing. EDIT may proceed with processing individual rows one at a time while progressing in a vertical direction selecting the next unprocessed row. For example, as illustrated in FIG. 5 EDIT may process pixel (0,0) then pixel (1,0), then pixel (2,0) and so on, until pixel (7,0) before proceeding to a next row starting with pixel (1,0) then continuing to a next pixel (1,1) etc. If starting at pixel (0,7) illustrated in FIG. 5, EDIT may proceed to pixel (1,7) and continue until the row is complete and then process a next (for example the next row above the just-processed row) row starting with pixel (0,6). Alternatively, processing could begin at pixel (7,7) and proceed to the left to the next pixel (6,7) and continue until the row is complete and then process the next row, for example the row above, starting with pixel (7,6). Whether horizontal processing proceeds left to right or right to left can be determined as described elsewhere herein. Similarly, whether vertical processing proceeds from top to bottom or from bottom to top can be determined as described elsewhere herein. Through this horizontal and/or vertical processing technique, EDIT can completely process an image.

FIG. 5 is an illustrative example of a few possible starting positions for a depth camera image processing during transformation, however other processing start positions not specifically illustrated are also possible.

Figure 6:
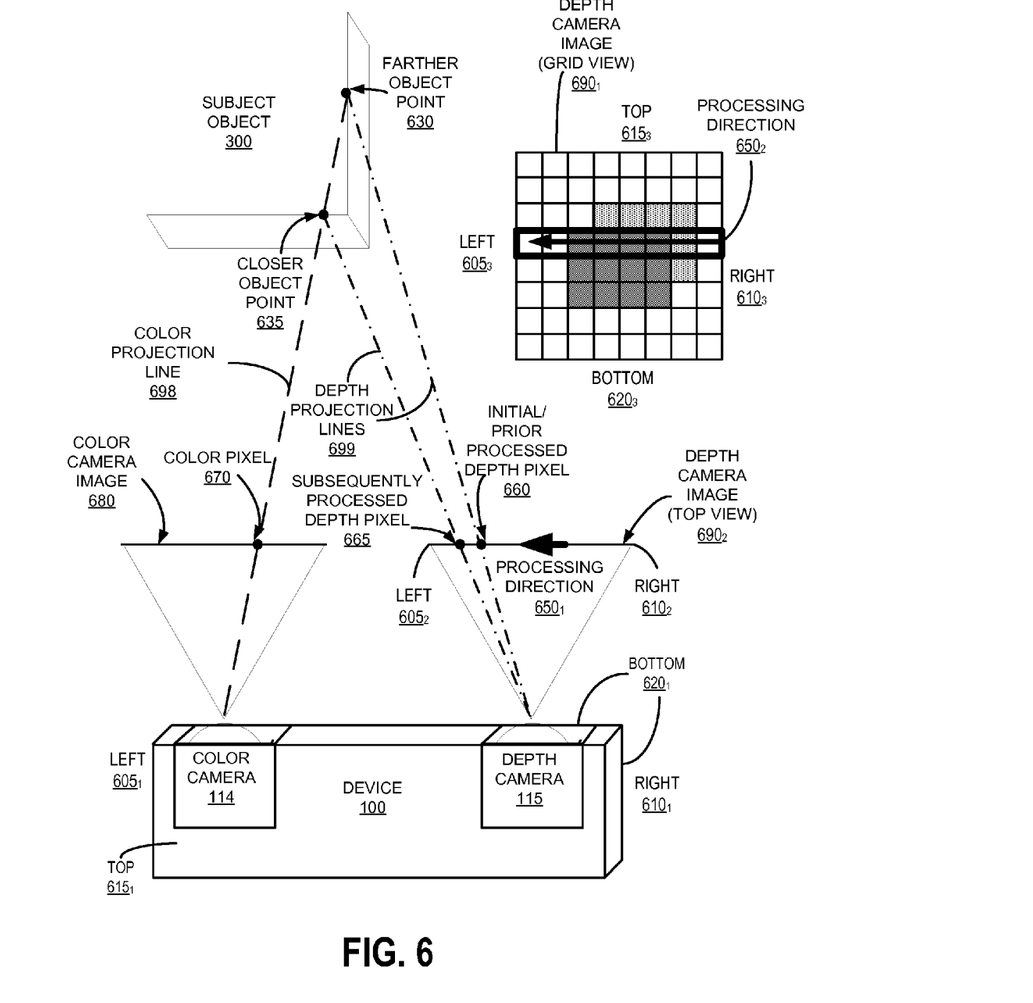
FIG. 6 illustrates an operating environment in which EDIT may perform right to left depth camera image processing, in one embodiment.
Figure 7:
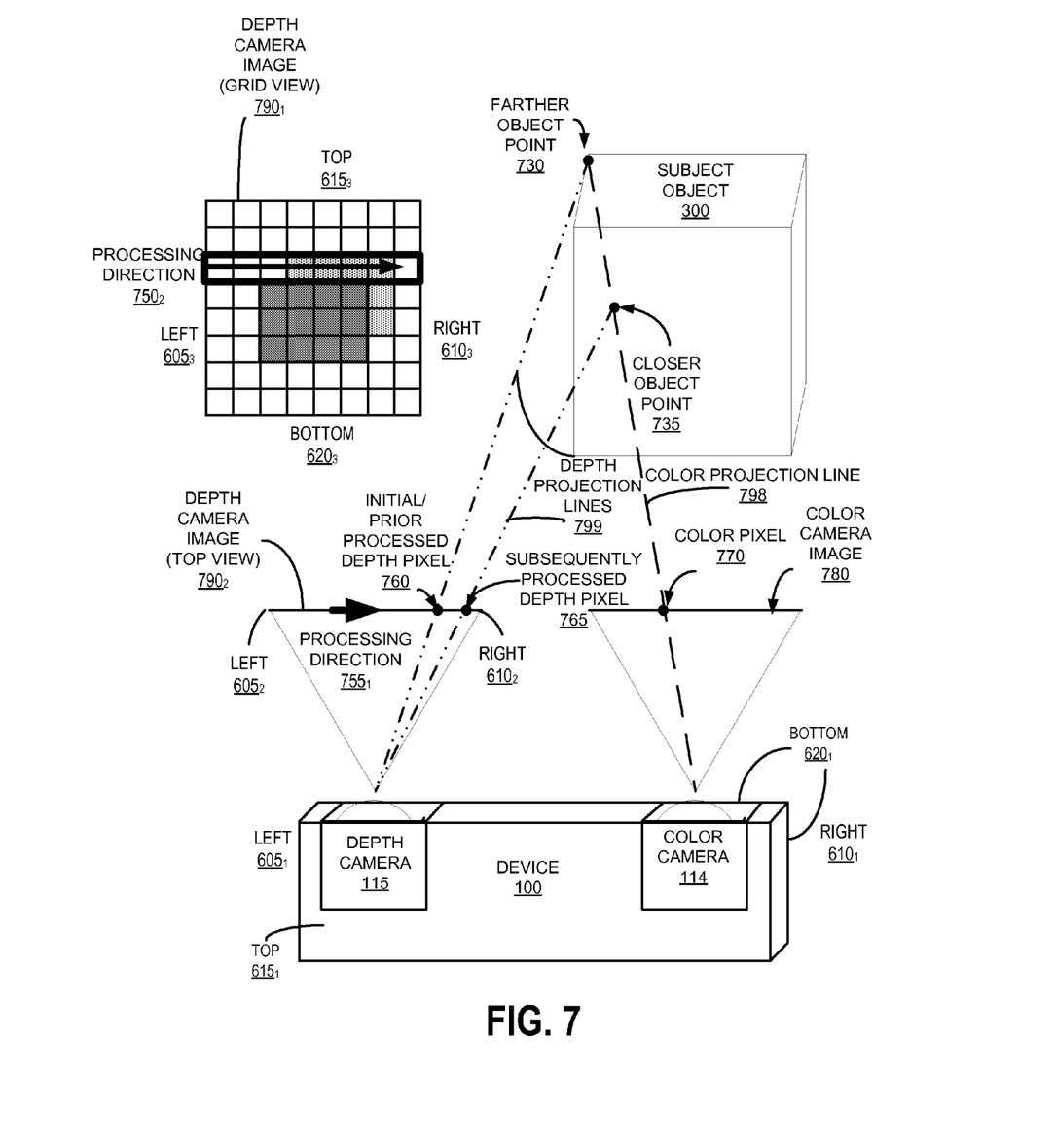
FIG. 7 illustrates an operating environment in which EDIT may perform bottom to top depth camera image processing, in one embodiment.

FIGS. 6-7 illustrate various examples of processing direction according to physical camera relative placement. For example, with regards to FIGS. 6-7, device 100 is illustrated as including a color camera 114 and depth camera 115 physically positioned with a relative side-by-side configuration (for example, left to right). Color camera 114 may be immediately adjacent to depth camera 115, or may be separated by other components or space. For example, device 100 may include a color camera 114 positioned centimeters, inches, or some other distance measurement apart from depth camera 115. Therefore, color camera 114 and depth camera 115 may have slightly different or askew viewpoints of a same scene (for example, different views of subject object 300).

Subject object 300 may be seen by color camera 114 and depth camera 115 from slightly varying viewpoints according to actual physical installation within device 100. For example, color pixels 670, and 770 have respective color projection lines 698, and 798 from FIGS. 6-7 respectively. The color projection lines plot a direct course to the closer object point 635, and 735 respectively. If not for closer object point 635, and 735, obstructing/occluding the farther object point 630, and 730 respectively, the farther object point 630, and 730 would be visible to the color camera 114. In one embodiment, EDIT is able to transform the depth value to the closer object point instead of the farther (occluded) object point providing a more appropriate depth value for the color camera image.

In comparison to the view of the color camera 114, depth camera 115 has a clear unobstructed view to both the closer object point 635, and 735 respectively and the farther object point 630, and 730 respectively (as indicated with depth projection lines 699, and 799). Therefore, depth camera 115 may record separate depth values in separate depth pixels for initial/prior processed depth pixel 660 and subsequently processed depth pixel 665.

Depth camera image 690, and 790 respectively are illustrated in FIGS. 6-7 from a top/below viewpoint (for example, $690_2$, and $790_2$) according to the respective image. A processing direction as viewed from above/below (for example, processing direction $650_1$, and $750_1$) is illustrated in FIGS. 6-7 respectively. In one embodiment, the processing direction 650, and 750 respectively, proceeds in a direction corresponding in physical space to a direction towards the color camera 114 from/away the depth camera 115.

The processing direction may be implemented relative to coordinates within the depth camera image. For example, EDIT may perform a left to right processing of pixels across the horizontal or x coordinate row from smallest x values (for example, x-y coordinates 0,0) incrementing until the largest x value is reached (for example, x-y coordinates 640,0 may indicate the last x value in a 2D depth camera coordinate system with a 640 by 480 pixel resolution). EDIT may perform a top to bottom pixel processing along the vertical or y coordinate column from smallest y values (for example, x-y coordinates 0,0) incrementing until the largest x value is reached (for example, x-y coordinates 0,480 may indicate the last/top most y value in a 2D depth camera coordinate system with a 640 by 480 pixel resolution).

The grid views $690_1$, and $790_1$ in FIGS. 6-7 respectively, illustrate the subject object in a 2D coordinate system of a depth camera. The grid views illustrate the 2D coordinate system (for example, x-y axis system) of a depth camera image as seen from the viewpoint of the depth camera sensor. Each box in the grid may represent a separate pixel (for example, depth pixel 430 of FIG. 4) having a defined depth value/intensity.

As used herein, left, right, top, and bottom are with respect to the viewpoints of each the respective camera sensors in device 100. For example, color camera 114 and depth camera 115 viewpoint includes subject object 300. Subject object 300 may be one of many objects in a scene (for example, captured scene 305) visible to the one or more cameras of device 100.

As illustrated in FIGS. 6-7, each camera may have a respective coordinate system. For example, color camera 114 has a color camera coordinate system that includes 2D coordinates, where each pixel or point within the 2D coordinate system represents a color value (for example, a RGB assignment/value). Depth camera 115 has a depth camera coordinate system that includes 2D coordinates, where each pixel or point within the 2D coordinate system represents a depth value/intensity (for example, distance from the sensor to a point in space, such as to object points of subject object 300).

FIG. 6 illustrates an operating environment in which EDIT may perform right to left depth camera image processing, in one embodiment. Specifically with regards to FIG. 6, color camera 114 is illustrated as having a physical position to the left of depth camera 115 (for example, "left" and "right" may be with respect to a viewpoint of a user holding the device up to take a photo of the scene that includes subject object 300). Therefore, EDIT may set/determine a depth image processing direction (for example, the processing direction represented in top view processing direction $650_1$ and grid view processing direction $650_2$). Described in an alternate way, the processing direction $650_{1\text{-}2}$ is in the direction traveled when physically traversing from the depth camera 115 to the color camera 114. For example, for FIG. 6, the processing direction is from device right $610_1$ to device left $605_1$. The processing direction is used for transforming the depth camera image pixel values into the color camera image 680. When performing a right to left processing of an image, EDIT will process an initial depth pixel 660 before processing a subsequent depth pixel 665. When transforming to the color camera image 680 of the color camera 114, the subsequently processed depth pixel 665 may be assigned to (i.e., overwrite) the same color pixel 670 as the prior (first, or initial) depth pixel 660. Typically, when two depth pixels are assigned to a same color point within the color camera coordinate system, a verification check determines which of the two depth conflicting depth values is less intensity/smaller value so as to assign the most accurate depth value to the color point "seen" by color camera 114 at color pixel 670. For example, the occluding depth pixel (for example closer object point 635) should be stored as the depth value for color pixel 670 instead of the occluded depth pixel (for example, farther object point 630).

In one embodiment, EDIT set the processing order for transforming the depth camera image according to the physical position of the depth camera relative to the color camera (for example, as descried herein in at least FIG. 2 above). Therefore, in one embodiment EDIT automatically overwrites/overrides previous (inappropriate/occluded) depth pixel values assigned to a specified color pixel (pixel 670).

The reference point to determine "left", "right", "up", or "down" is not necessarily always with respect to a user view, or device view, but may be with respect to any defined starting point or orientation and EDIT can apply the same relative processing direction for the depth camera image. In one embodiment, alternative starting points or orientations used for determining directions are within the scope of EDIT, and EDIT will apply the same relative positioning when determining the processing direction for the depth camera image. For example, upon determining a relative direction set for "left" "right" "up" or "down" (for example, left $605_1$, right $610_1$, top $615_1$, and bottom $620_1$) with respect to positioning sensors of device 100, EDIT applies the same relative direction set for the basis of processing directions of the depth camera image (for example, left $605_3$, right $610_3$, top $615_3$, and bottom $620_3$). In other words, if "top" is arbitrarily applied to a reference point, EDIT can verify that the processing direction is consistently applied such that the same relative direction of "top" is applied during processing of the depth camera image.

As illustrated in FIG. 6, a first processed depth pixel 660 represents a depth to farther object point 630 and is initially assigned/stored to color pixel 670 at time T1. Next, at time T2, EDIT processes the pixel with a 2D coordinate immediately adjacent (as determined according to relative camera placement of the depth and color cameras) to the left of the initial processed depth pixel 660. As illustrated, this adjacent pixel in the depth camera image is the subsequently processed depth pixel 665. In response to transforming this point to the color camera image 680, depth pixel 665 is also (at time T2) assigned/stored to color pixel 670, overwriting the previous depth value from depth the initial processed depth pixel 660.

FIG. 7 illustrates an operating environment in which EDIT may perform left to right depth camera image processing, in one embodiment. FIG. 7 illustrates an environment in which the depth camera 115 is positioned to the left of the color camera 114. Therefore, as illustrated, EDIT processes the depth camera image in a left to right order.

For example, as illustrated in FIG. 7, a first processed depth pixel 760 represents a depth to farther object point 730 and is initially assigned/stored to color pixel 770 at time T1. Next, at time T2 EDIT processes (via direction 755) the pixel with a 2D coordinate to immediately adjacent (as determined earlier according to relative camera placement of the depth and color cameras) to the left of the first (initially processed) depth pixel 760. As illustrated, this adjacent pixel in the depth camera image is the subsequently processed depth pixel 765. In response to transforming this point to the color camera image 780, subsequently processed depth pixel 765 is also assigned/stored to the position occupied by color pixel 770 at time T2, overwriting the previous depth value from depth pixel 760.

With reference to both FIGS. 6 and 7, it is understood that a right to left processing order or a left to right processing order may both be considered a horizontal depth camera pixel processing order. In some embodiments, the processing order includes a vertical depth camera pixel processing order. The vertical depth camera pixel processing order may include a bottom to top depth camera pixel processing order when the depth camera is physically positioned below the other physical position (for example, below a color camera). The vertical depth camera pixel processing order may include a top to bottom depth camera pixel processing order when the depth camera is physically positioned above the other physical position (for example, above a color camera).

In some embodiments, in response to completing the depth to color image transformation (for example, performing EDIT) as described above, the transformed depth map may not be completely filled. For example, warping may render multiple pixels of the original depth map into a single pixel of the new depth map or the original depth map may not have started as completely filled. When the transformed depth map has pixels with no depth measurements, a hole filling process may be implemented. For example, hole filling may include analyzing neighboring pixels to determine if they are similar and filling the hole with an average depth. If the neighboring pixels are not similar the hole may not be filled. The hole filling process may be separate and different from the transformation process associated with physical depth camera sensor location as described above.

As described above, device 100 can be a portable electronic device (for example, smart phone, dedicated augmented reality (AR) device, game device, wearable device such as eyeglasses, or other device with AR processing and display capabilities for displaying an augmented reality image). The device implementing the AR system described herein may be used in a variety of environments, such as shopping malls, streets, rooms, or anywhere a user may take a portable device. In an AR context, a user may use the device 100 to view a representation of the real world through the display of their device. A user may interact with their AR capable device by using their device's camera to receive real world images/video and superimpose or overlay additional or alternate information onto the displayed real world images/video on the device. As a user views an AR implementation on their device, real world objects or scenes may be replaced or altered in real time on the device display. Virtual objects (for example, text, images, video) may be inserted into the representation of a scene depicted on a device display.

Movement of the device 100 and color camera 114 can cause the display to update, in real-time, an augmentation of a target (for example, one or more objects or scenes) in the SLAM Map. With movement of the device away from an initial reference image position, the device can capture additional images from alternate views. After extracting features and triangulating from additional keyframes, increased accuracy of the augmentation can be achieved (for example, borders around an object may fit more precisely, the representation of the object in the scene will appear more realistic, and target placement can be more accurate relative to the color camera 114 pose).

In one embodiment, an object or graphic may be inserted or integrated into a video stream (or image) captured by the color camera 114 and displayed on display 112. EDIT may optionally prompt the user for additional information to augment the target. For example, the user may be able to add user content to augment the representation of the target. User content may be an image, 3D object, video, text, or other content type that can be integrated with, or overlaid with, or replace a representation of the target.

The display may update in real-time based on tracking from the original scene. For example, text on a sign may be replaced with alternate text, or a 3D object may be strategically placed in the scene and displayed on device 100. When the user changes the position and orientation of the color camera 114, the graphic or object can be adjusted or augmented to match the relative movement of the color camera 114. For example, if a virtual object is inserted into an augmented reality display, camera movement away from the virtual object can reduce the size of the virtual object relative to the distance traveled by the color camera 114. For example, taking four steps back from a virtual object should cause a greater reduction in size of the virtual object compared to taking a half step back from the virtual object, all other variables being equal. Motion graphics or animation can be animated within the scene represented by EDIT. For example, an animated object can "move" within a scene depicted in the augmented reality display. A person of skill in the art will recognize that embodiments described herein can be implemented in ways other than AR (for example, robot positioning).

EDIT may be implemented as software, firmware, hardware, module or engine. In one embodiment, the previous EDIT description may be implemented by the general purpose processor 161 in memory 164 of device 100 to achieve the previously desired functions (for example, to implement the method of FIG. 2). In some embodiments, features of one or more of the described subcomponents may be combined or partitioned into different individual components, modules or engines.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read only memory (EPROM), electrically erasable programmable read-only memory (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware (for example, hardware 162), software (for example, software 165), firmware (for example, firmware 163), or any combination thereof. If implemented in software as a computer program product, the functions or modules may be stored on or transmitted over as one or more executable instructions or code on a non-transitory computer-readable medium. Computer-readable media can include both computer storage media and communication media including any medium that facilitates transfer of a computer program from one place to another. A storage media may be any available media that can be accessed by a computer, or data processing device/system. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of executable instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for depth camera image transformation, the method comprising:
   receiving a depth camera image from a depth camera;
   determining, according to a physical position of the depth camera relative to a physical position of a color camera, a processing order for transforming points of the depth camera image into a depth image at a coordinate system of the color camera associated with the physical position of the color camera, wherein the depth camera and the color camera are situated on a same plane that is parallel to a depth camera image plane;
   transforming, without testing for depth, the depth camera image into the coordinate system of the color camera according to the determined processing order; and
   implementing a hole filling process in the transformed depth camera image, wherein the depth camera and the color camera are integrated into a same device.

2. The method of claim 1, wherein the processing order comprises a horizontal depth camera pixel processing order.

3. The method of claim 2, wherein the horizontal depth camera pixel processing order comprises:
   a left to right depth camera pixel processing order when the depth camera is physically positioned left of the physical position of the color camera.

4. The method of claim 2, wherein the horizontal depth camera pixel processing order comprises:
   a right to left depth camera pixel processing order when the depth camera is physically positioned right of the physical position of the color camera.

5. The method of claim 1, wherein the processing order comprises completing a horizontal depth camera pixel processing for a first row before proceeding in a vertical direction to select a second row for additional horizontal depth camera pixel processing.

6. The method of claim 1, wherein the processing order comprises a vertical depth camera pixel processing order.

7. The method of claim 6, wherein the vertical depth camera pixel processing order comprises:
a bottom to top depth camera pixel processing order when the depth camera is physically positioned below the physical position of the color camera.

8. A mobile device for displaying an image, the mobile device comprising:
a processor; and
a storage device coupled to the processor and configurable for storing instructions, which, when executed by the processor cause the processor to:
receive a depth camera image from a depth camera;
determine, according to a physical position of the depth camera relative to a physical position of a color camera, a processing order for transforming points of the depth camera image into a depth image at a coordinate system of the color camera associated with the physical position of the color camera, wherein the depth camera and the color camera are situated on a same plane that is parallel to a depth camera image plane;
transform, without testing for depth, the depth camera image into the coordinate system of the color camera according to the determined processing order; and
implement a hole filling process in the transformed depth camera image, wherein the depth camera and the color camera are integrated into the mobile device.

9. The mobile device of claim 8, wherein the processing order comprises a horizontal depth camera pixel processing order.

10. The mobile device of claim 9, wherein the horizontal depth camera pixel processing order comprises:
a left to right depth camera pixel processing order when the depth camera is physically positioned left of the physical position of the color camera.

11. The mobile device of claim 9, wherein the horizontal depth camera pixel processing order comprises:
a right to left depth camera pixel processing order when the depth camera is physically positioned right of the physical position of the color camera.

12. The mobile device of claim 8, wherein the processing order comprises completing a horizontal depth camera pixel processing for a first row before proceeding in a vertical direction to select a second row for additional horizontal depth camera pixel processing.

13. The mobile device of claim 8, wherein the processing order comprises a vertical depth camera pixel processing order.

14. The mobile device of claim 13, wherein the vertical depth camera pixel processing order comprises:
a bottom to top depth camera pixel processing order when the depth camera is physically positioned below the physical position of the color camera.

15. A machine readable non-transitory storage medium having stored therein program instructions that are executable by a processor to:
receive a depth camera image from a depth camera;
determine, according to a physical position of the depth camera relative to a physical position of a color camera, a processing order for transforming points of the depth camera image into a depth image at a coordinate system of the color camera associated with the physical position of the color camera, wherein the depth camera and the color camera are situated on a same plane that is parallel to a depth camera image plane;
transform, without testing for depth, the depth camera image into the coordinate system of the color camera according to the determined processing order; and
implement a hole filling process in the transformed depth camera image, wherein the depth camera and the color camera are integrated into a same device.

16. The medium of claim 15, wherein the processing order comprises a horizontal depth camera pixel processing order.

17. The medium of claim 16, wherein the horizontal depth camera pixel processing order comprises:
a left to right depth camera pixel processing order when the depth camera is physically positioned left of the physical position of the color camera.

18. The medium of claim 16, wherein the horizontal depth camera pixel processing order comprises:
a right to left depth camera pixel processing order when the depth camera is physically positioned right of the physical position of the color camera.

19. The medium of claim 15, wherein the processing order comprises completing a horizontal depth camera pixel processing for a first row before proceeding in a vertical direction to select a second row for additional horizontal depth camera pixel processing.

20. An apparatus for displaying an image, the apparatus comprising:
means for receiving a depth camera image from a depth camera;
means for determining, according to a physical position of the depth camera relative to a physical position of a color camera, a processing order for transforming points of the depth camera image into a depth image at a coordinate system of the color camera associated with the physical position of the color camera, wherein the depth camera and the color camera are situated on a same plane that is parallel to a depth camera image plane;
means for transforming, without testing for depth, the depth camera image into the coordinate system of the color camera according to the determined processing order; and
means for implementing a hole filling process in the transformed depth camera image, wherein the depth camera and the color camera are integrated into a same device.

21. The apparatus of claim 20, wherein the processing order comprises a horizontal depth camera pixel processing order.

22. The apparatus of claim 21, wherein the horizontal depth camera pixel processing order comprises:
a left to right depth camera pixel processing order when the depth camera is physically positioned left of the physical position of the color camera.

23. The apparatus of claim 21, wherein the horizontal depth camera pixel processing order comprises:
a right to left depth camera pixel processing order when the depth camera is physically positioned right of the physical position of the color camera.

24. The apparatus of claim 20, wherein the processing order comprises completing a horizontal depth camera pixel processing for a first row before proceeding in a vertical direction to select a second row for additional horizontal depth camera pixel processing.

* * * * *